(12) United States Patent
Kilim et al.

(10) Patent No.: US 6,287,491 B1
(45) Date of Patent: Sep. 11, 2001

(54) MOULDING PLASTICS ARTICLE BY VARYING CYCLICALLY ITS COMPOSITION

(76) Inventors: Rafael Zvi Karl Kilim; Simcha Izkhak Kilim, both of 89 Northway, London (GB), NW2 7JL ( * ) Notice: Subject to any disclaimer, the term of this patent is extended or adjusted under 35 U.S.C. 154(b) by 0 days.

(21) Appl. No.: 09/308,834

(22) PCT Filed: Nov. 26, 1997

(86) PCT No.: PCT/GB97/03229

§ 371 Date: May 25, 1999

§ 102(e) Date: May 25, 1999

(87) PCT Pub. No.: WO98/23433

PCT Pub. Date: Jun. 4, 1998

(30) Foreign Application Priority Data

| Nov. 28, 1996 | (GB) | ................................. 9624829 |
| Jan. 17, 1997 | (GB) | ................................. 9700949 |
| Feb. 4, 1997 | (GB) | ................................. 9702278 |

(51) Int. Cl.[7] .................. B29C 44/06; B29C 45/16; B29C 45/46; B29C 47/36

(52) U.S. Cl. .................. 264/40.1; 264/45.5; 264/241; 264/328.18; 425/145; 425/461; 425/580

(58) Field of Search .................. 264/45.1, 328.18, 264/45.5, 241, 40.1, 255; 425/580, 145, 465, 461

(56) References Cited

U.S. PATENT DOCUMENTS

| 3,873,656 | * | 3/1975 | Garner | 264/45.1 |
| 3,947,175 | * | 3/1976 | Melcher | 264/45.1 |
| 3,966,372 | * | 6/1976 | Yasuike et al. | 425/4 R |
| 3,972,664 | * | 8/1976 | Fillmann | 264/45.1 |
| 4,014,966 | * | 3/1977 | Hanning | 264/45.1 |
| 4,035,466 | * | 7/1977 | Langecker | 264/45.1 |
| 4,106,887 | * | 8/1978 | Yasuike et al. | 264/45.1 |
| 4,507,255 | * | 3/1985 | Shizawa | 264/45.1 |
| 4,629,410 | * | 12/1986 | Hehl | 425/145 |
| 4,781,554 | * | 11/1988 | Hendry | 425/4 R |
| 4,919,864 | * | 4/1990 | Knaus | 264/45.9 |
| 4,948,665 | * | 8/1990 | Rosen | 264/328.18 |
| 5,424,020 | * | 6/1995 | Hara et al. | 264/328.18 |
| 5,443,378 | * | 8/1995 | Jaroschek et al. | 425/130 |
| 5,976,446 | * | 11/1999 | Lin et al. | 264/328.18 |

* cited by examiner

Primary Examiner—Allan R. Kuhns
(74) Attorney, Agent, or Firm—Jackson Walker L.L.P.

(57) ABSTRACT

The method of moulding plastics articles comprises propelling a solid plastics feed material by screw feed means (10) through a melting zone, the screw feed means (10) propelling the resultant molten plastics material to shaping means, shaping the molten plastics material in the shaping means and allowing the material to solidify to retain the shape, and is characterised by varying the composition of the plastics material cyclically before or along the length of the screw feed means (10) so that the molten material (1,2) emerging from the screw feed means (10) varies in composition with time, whereby at least one part of each moulded article (50) is of different composition from the remainder of the article (50).

18 Claims, 4 Drawing Sheets

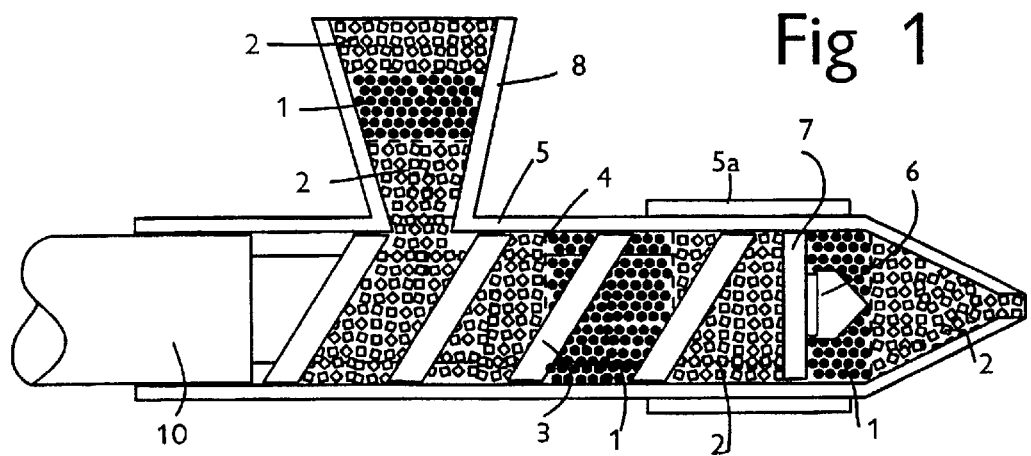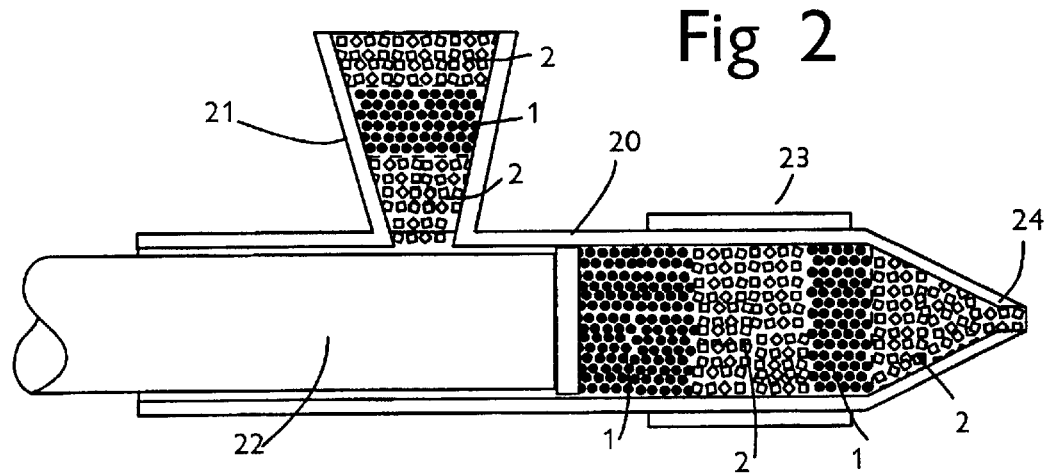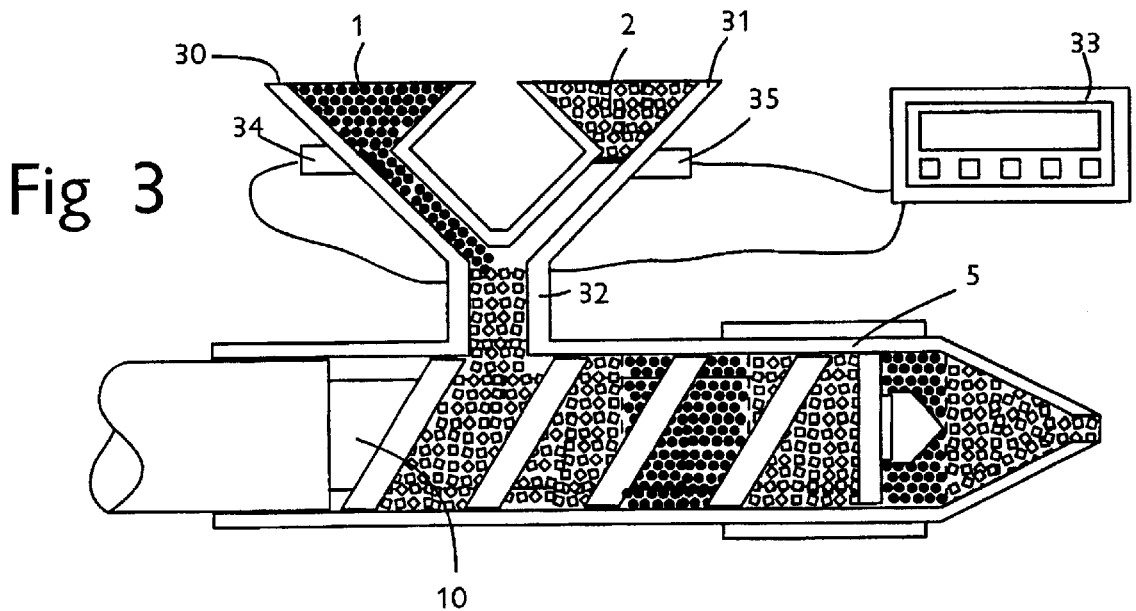

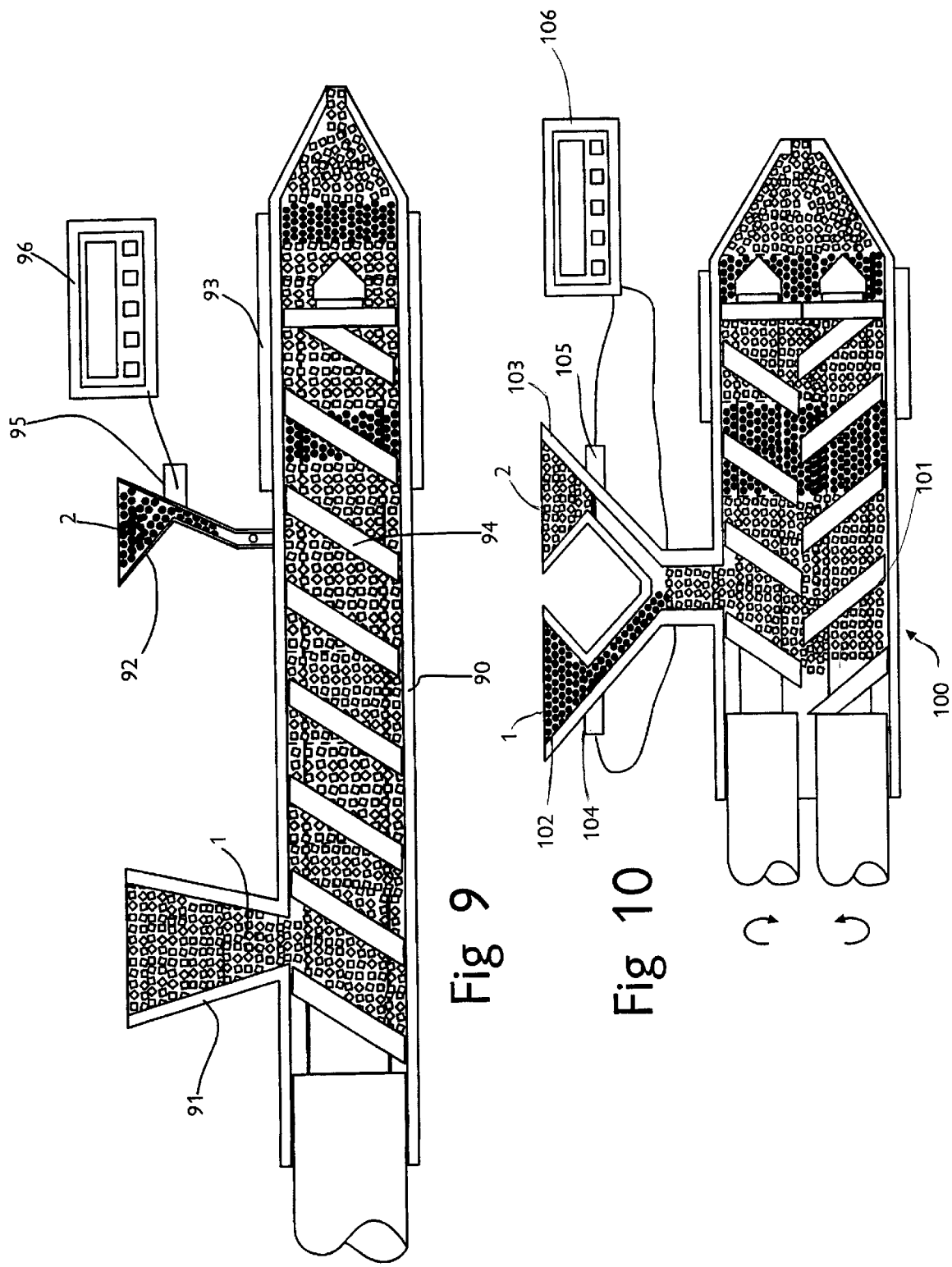

MOULDING PLASTICS ARTICLE BY VARYING CYCLICALLY ITS COMPOSITION

FIELD OF THE INVENTION

This invention relates to a method of and apparatus for moulding plastics articles.

BACKGROUND OF THE INVENTION

In plastics injection moulding, molten plastics material forms layers as it fills the mould cavity. The first material entering the cavity forms the outer skin of the article being moulded and the rest of the material entering after this continues to form the core layers of the article. This phenomenon has been exploited by using two barrel injection moulding machines and injecting in sequence materials to form articles in which the skin is formed of a different material from the core, for example incorporating colour in the skin and then filling with cheaper uncoloured material, or by filling the skin with a plastics material containing fillers which would otherwise give an unsatisfactory surface finish.

In JP-A-5084733 there is disclosed an arrangement in which two separate materials are injected sequentially by two separate injectors into an accumulator, and then the sequence is expelled from the accumulator by a piston into the mould cavity to produce moulded articles with layers of the different materials. It will be seen that in this arrangement the materials are only formed into a sequence after being separately melted and plasticised in separate injectors. The necessary apparatus is costly and complex.

A disadvantage of such techniques is that the machinery required is costly and complicated.

SUMMARY OF THE INVENTION

The invention provides a method of moulding plastics articles wherein at least one predetermined part of each moulded article is of different composition from the remainder of the article, comprising propelling a solid plastics feed material (1,2) by screw feed means through a melting zone (5a), the screw feed means (3, 10) propelling the resultant molten plastics material to shaping means, shaping the molten plastics material in the shaping means and allowing the material to solidify to retain the shape, wherein the composition of the material entering the shaping means is varied cyclically, characterized by varying the composition of the plastics material cyclically before or along the length of the screw feed means.

Preferably the method comprises providing in the plastics material entering the screw feed means sequential layers of materials of different composition, the size and spacing of the layers being chosen such that a predetermined part of each moulded article is of a different composition from the remainder of the article.

Alternatively, the method may comprise providing in the plastics material at a predetermined position along the length of the screw sequential layers of materials of different compositions, the size and spacing of the layers being chosen such that a predetermined part of each moulded article is of a different composition from the remainder of the article.

Preferably, one of the materials is a first plastics material and the other material is a combination of the first material and at least one additive material which can alter a physical characteristic or property of the first material. Thus, for example, a part of the surface of the article could be made softer than the remainder of the article by introducing insufficient of the softer material to coat the whole of the mould surface on initial injection into the mould.

In one method in accordance with the invention, the additive material, or at least one of the additive materials (since more than one additive may be introduced, either simultaneously or in such a manner as to produce additional sequential layers of different characteristics) is a blowing agent and the timing of the dose is such that the blowing agent is delivered to the interior of the article in the mould after the formation of a surface layer free from the blowing agent, thereby producing a moulded article whose core is of expanded plastics material (and thus of relatively low cost).

Alternatively, injection blow moulding may be carried out, with a first mould being used as an injection mould, and the resultant article being removed to a blow mould while the plastics material is still capable of stretching, to be inflated into contact with the blow mould to form the final article, for example, a plastics bottle. In this manner, the resultant hollow article may be formed with, for example, an overall surface layer of a different material or characteristic than the inner core of the moulding. The surface layer can thus form a barrier layer which will not affect, or be affected by, the contents of the bottle, while the core, which may not be suitable for contact with the bottle's contents, provides the strength of the bottle.

Another aspect of the invention provides a method of forming an extruded plastics article, comprising passing a solid plastics feed material through a melting zone, extruding the resultant molten material through a die, and allowing the extruded plastics material to solidify, characterised by providing in the feed material entering the melting zone sequential layers of first and second materials, the size and spacing of the layers being chosen such that the first and second materials appear sequentially along the length of the extruded article.

The or each material may be delivered to the feed hopper of a plasticising screw device, or to a point along the plasticising screw device.

Where an additive material is used, it may be selected from such materials as colorants, ultra violet protective materials, reinforcing materials, for example glass powder or fibres, and other fillers, as well as materials affecting the hardness, resilience or surface finish of the plastics material. The additive may be in the form of a powder, granules, a masterbatch, a paste or a liquid.

Since some blending of the materials will take place in the plasticising device, the layers produced will not have sharply-defined boundaries. This will have the beneficial effect of improving adhesion between the layers, avoiding the risk of desalination, for example. Where a small dose of an additive such as a colorant is added to a basic plastics material, the boundaries between the coloured and non-coloured regions of the final moulded article will be even less sharp, and may give rise to a continuous variation between maximum and minimum concentration of colorant. In this case, the timing of the additive may be arranged to give a maximum concentration in the surface region of an injection moulded article, with some residual coloration of the interior of the article. While it may be argued that such coloration represents a wastage of colorant, the costs benefits over moulding in continuous colour will be substantial, and the cost of adapting the injection moulding apparatus to provide skin coloration in accordance with the present invention will be relatively small, far outweighing the possible slightly greater usage of colorant as compared with twin injection techniques.

In the case of sequences of two or more materials being used, the materials may be different grades of plastics material, for example softer and harder materials, or of different chemical composition. Alternatively one or both materials may comprise a basic plastics material with additives of the type mentioned hereinbefore blended therewith.

The plastics material may be thermoplastic or thermosetting. Synthetic and natural rubbers may be moulded in accordance with the method of the invention, permitting such articles as shoe soles to be formed with, for example, a wear resistant skin and a soft core.

It has been found that, in some plasticising machines, a sharper boundary may be produced between two different materials in a sequence if the first material is introduced into the screw, and the next material is not introduced until the first has been conveyed by the screw to a point adjacent to the front end of the screw. The second material is then conveyed into contact with the first before it is propelled to the shaping process (injection or extrusion).

The invention also provides apparatus for moulding plastics in which at least one predetermined part of each moulded article is of different composition from the remainder of the article, comprising an injection device including screw feed means for propelling a solid plastics material through a melting zone, and for propelling the resultant molten plastics material to shaping means for shaping the molten material, including means for cyclically varying the composition of the plastics material entering the shaping means, characterised in that the means for varying the composition of the plastics material cyclically is located before or along the length of the screw feed means.

The apparatus may comprise twin intermeshing screws to convey the plastics material through the melting zone.

BRIEF DESCRIPTION OF THE DRAWINGS

In the drawings, which illustrate exemplary embodiments of the invention:

FIG. 1 is a cross-sectional diagrammatic view of a screw and barrel with feed hopper;

FIG. 2 is a cross-sectional diagrammatic view of a piston injector;

FIG. 3 is a view corresponding to that of FIG. 1, but including an alternative hopper arrangement for introducing the additive;

FIG. 9 is a sectional view of an injector according to another embodiment of the invention;

FIG. 10 is a sectional view of a twin-screw apparatus according to yet another embodiment of the invention.

DETAILED DESCRIPTION OF THE ILLUSTRATED EMBODIMENTS

Figure 4:
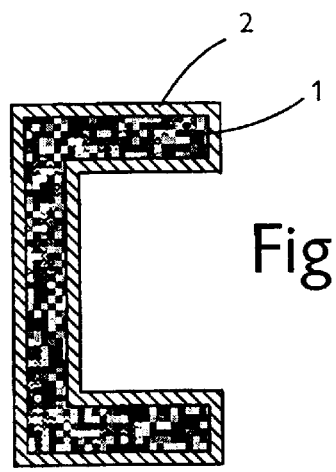
FIG. 4 is a cross-sectional view of an article injection moulded in accordance with the invention.

Referring first to FIG. 1, the injector comprises a cylinder or barrel 5 containing a screw 10. Solid plastics feed material, in the form of granules, is supplied to the screw by way of a hopper 8. The granules are moved along the barrel by the screw, passing through a heated section 5a where the material melts. Layers of a first solid plastics material 1 are interspersed between layers of a second plastics material 2 of different composition or physical characteristics, for example colour, in such a manner that the void 4 between the flight 3 of the screw 10 is then filled with a sequence of the materials 1 and 2, the sequence remaining essentially the same along the length of the screw as the materials are melted and plasticised. The materials pass the valve ring 7 and are delivered to the screw tip 6 in the same sequence, and from there are delivered into the mould cavity in the same sequence.

It will be appreciated that in substitution for the second plastics material 2 relatively small doses of modifying additives such as colour may be used. In the case of colour, the plastics material 1 having the highest concentration of the additive after plasticising enters the mould cavity first to form the coloured surface layer of the moulded article.

In the apparatus of FIG. 2, batches of the two materials 1 and 2, in layers, are introduced into the cylinder 20 via a hopper 21 and are propelled by the piston 22 through the heated zone 23 to emerge melted from the nozzle 24 in the same sequence as the materials were introduced into the hopper.

FIG. 3 shows an arrangement in which two separate hoppers 30 and 31 feed into a common feed passage 32 to the barrel 5 of the injector. A programmable controller 33 controls the sequence of opening of shutter devices 34 and 35 which regulate the flow of granular materials out of the hoppers 30 and 31, thereby achieving the correctly sequenced layers of materials 1 and 2 in the passage 32. The controller 33 may, if desired, be set up to receive information on the volume of the mould cavities and the thickness of the layer of the second material on the surface of the moulded articles, for example, and from this to determine the duration and timing of the opening of the shutters to release the materials.

FIG. 4 shows an injection moulded article having a surface layer containing a high concentration of the additive material 2 and a core of the basic plastic material 1. Although a relatively sharp boundary is depicted between the two materials, in practice a blending would tend to occur, with concentration of the additive diminishing away from the surface. The last of the material to enter the mould cavity needs also to be coloured, in order to avoid leaving an uncoloured plug on the surface of the article corresponding to the entry into the mould cavity. Thus, the necessary build up of concentration of the colorant towards the end of the injection shot into the mould also ensures that the greatest concentration is again achieved at the surface of the next moulding produced in the cavity.

Figure 5:
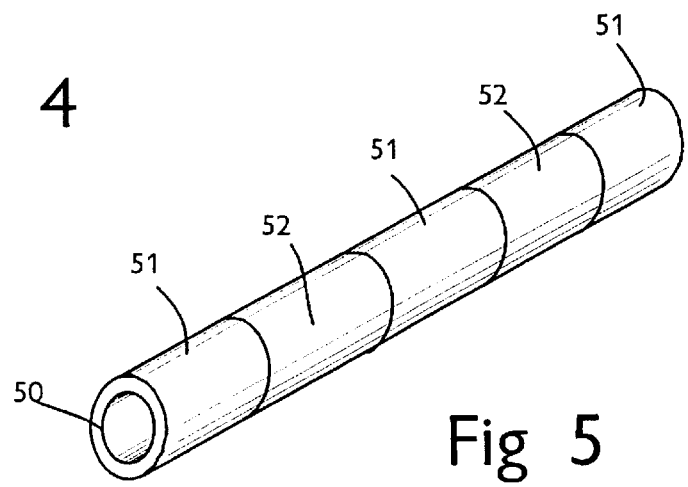
FIG. 5 is a perspective view of a tubular article extruded in accordance with the invention.

FIG. 5 shows an extruded article, in the form of a tube 50, having alternating regions 51 and 52 along its length of two different materials, for example with and without additive giving different characteristics. For example, it might be desirable to have regions in an automobile hose of greater and lesser resilience or stiffness, and the addition of different additives to the basic plastics material being extruded could achieve this.

Figure 6:
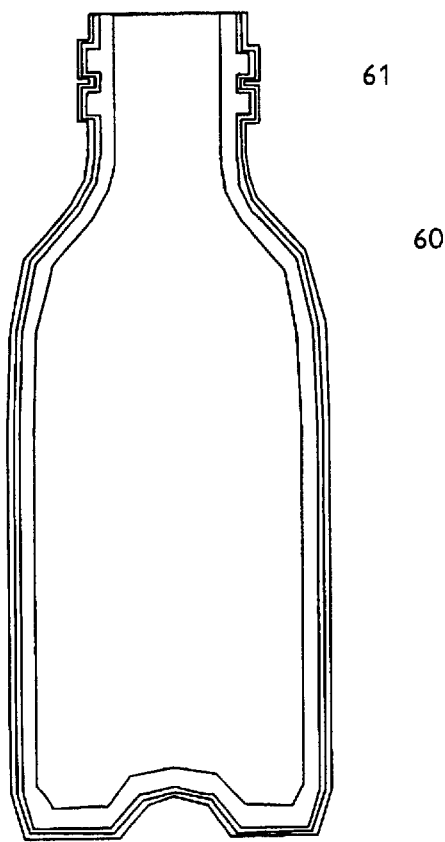
FIG. 6 is a sectional view of an injection blow-moulded bottle produced by a method in accordance with the invention.

FIG. 6 shows a blow-moulded plastics bottle 60, formed by injection moulding into a first, small mould cavity, and then, before the plastics material has fully hardened, transferring the resultant hollow moulding to a second, larger, mould cavity and then applying pressurised gas to the interior of the moulding to inflate it into contact with the new cavity to produce the final shape. The portion of the first cavity forming the neck 61 of the bottle is essentially the same as the corresponding portion of the second cavity, so that the neck portion is formed with greater accuracy and rigidity than the remainder of the bottle. The materials entering the first cavity are sequenced such that sufficient of a first material enters the mould to ensure that, when the second material follows it into the cavity, the first coats the entire surface of the cavity, and the second material forms a core. Thus, for example, the surface material may be such as to be unaffected by the liquid to be contained in the bottle, while the core material may confer tensile strength and/or rigidity.

Figure 7:
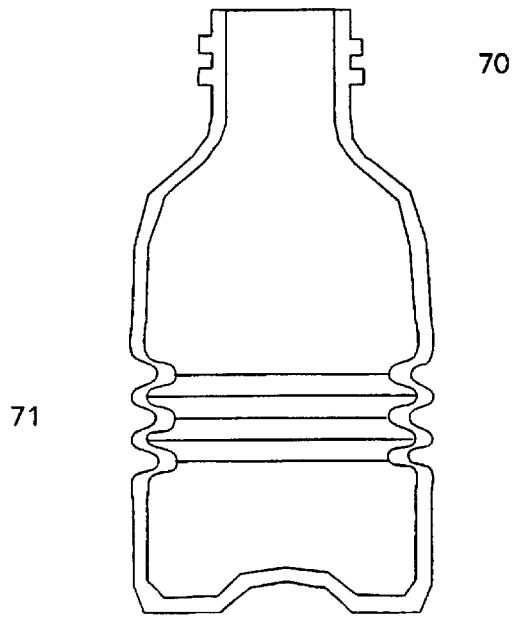
FIG. 7 is a sectional view of a longitudinally-compressible bottle produced by extrusion blow-moulding in accordance with another method of the invention.

FIG. 7 illustrates an alternative configuration of blow-moulded bottle 70, in which the sequence of the materials is controlled such that a central portion 71 of the bottle is formed of a material of greater flexibility than the remainder of the bottle, so as to be more readily collapsible as the bottle empties, in use. This ensures that the air space above the liquid in the bottle is maintained as small as possible, thereby reducing the risk of oxidation of the liquid, for example.

Figure 8:
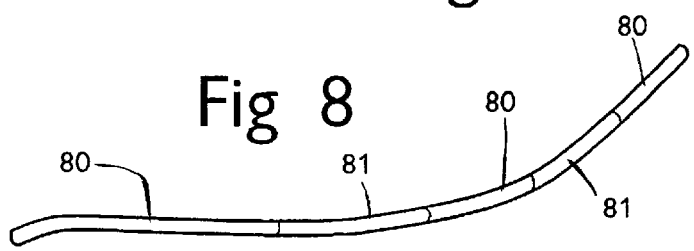
FIG. 8 illustrates a portion of an elongate extrusion produced by a method in accordance with the invention.

FIG. 8 illustrates how an elongate extruded article may be formed with alternating longitudinal regions 80 and 81 of different materials, for example of different flexibility, colour or other properties. The article may be, for example, a filament, which may be a textile filament. In this last case, the filament may be incorporated into yarn having special characteristics when spun (if necessary) and woven or knitted.

In the example shown in FIG. 9, the screw plasticiser 90 has a first feed hopper 91 at one end of the screw and a second feed hopper 92 at a position before the melting zone 93 at which the flight 94 of the screw is changed in shape so as to effect a reduction in pressure in the material, permitting additional material to be introduced under gravity, rather than requiring pressure insertion. The flow from the second hopper 92 is controlled by valve means 95, in turn controlled by a programmable controller 96, to produce a sequence of layers in the material in the screw of the material from the first hopper and material from the second hopper mixed with the first material.

The twin-screw plasticiser device 100 shown in FIG. 10 is typical of the type of plasticiser used for extrusion moulding, the material being propelled from the plasticiser continuously while the screws 101 rotate. The screws 100 are arranged to rotate in opposite directions and to intermesh. First and second materials are introduced into the path of the screws by means of twin hoppers 102 and 103, discharge from which into the screw is controlled by flap valves 104 and 105 controlled by a programmable controller 106.

Figure 11:
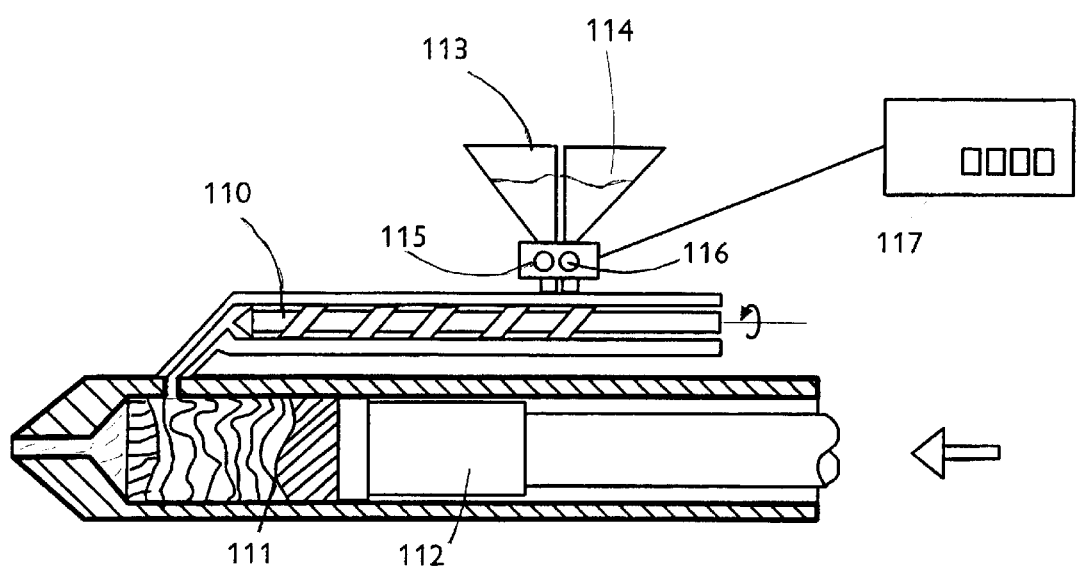
FIG. 11 is a sectional view of combination screw and piston machine in accordance with the invention.

The dual screw and piston device shown in FIG. 11 is the type of machine typically used for very high volume moulding with charges of 1 kg to 100 kg, which the combination screw piston type of machine cannot readily handle. In this type of machine, a small screw 110 rotates and plasticises at high speed to supply a large cylinder 111 having a separate injecting piston 112 therein. The piston 112 moves backwards to accommodate introduction of material from the screw 110, and then when the full charge is loaded the piston 112 is driven forwards to inject the charge into the mould.

First and second materials are introduced into the screw in the desired sequence by means of hoppers 113 and 114, each having a respective feed auger 115 and 116 to control the rate of supply of the material, the augers being in turn controlled by a programmable controller 117. The different materials are supplied to the cylinder 111 in such a manner as to form layers therein (although these will be laid down in the reverse order to that in which they are injected into the mould). The piston drives the materials into the mould in the predetermined sequence so that different parts of the finished moulded article are differently composed.

In each embodiment described with reference to the drawings, the controller can be arranged to receive control information from the screw/injector or extruder. For example, the screw start/stop signal can be used as the basis for control, with factors such as screw-back time and shot weight being entered for the particular job. In an alternative arrangement, the position of the screw can be used to provide control signals for the augers to control their rate of feed as the screw travels backwards. Information such as back pressure, speed of screw-back, time of screw-back and rotational speed can be used to provide more accurate feeding to the screw.

What is claimed is:

1. In a method of molding plastics articles, each said article having at least one predetermined part of a different composition from the remainder of the article, the method comprising introducing a solid plastics feed material into a screw feed means and rotating said screw feed means to propel said feed material through a melting zone, propelling the resultant molten plastics material to shaping means, shaping the molten plastics material in the shaping means and allowing the material to solidify to retain the shape, wherein the composition of the material entering the shaping means is varied cyclically, the improvement comprising monitoring the movement of the screw feed means and controlling the introduction of different feed materials into said screw feed means according to the instantaneous monitored position of said screw feed means so as to vary the composition of the plastics feed material cyclically at a position remote from the shaping means, whereby the composition of the material entering the shaping means is controlled to form said at least one predetermined part of the molded article of different composition from the remainder of the article.

2. A method according to claim 1, wherein on of the materials is a first plastics material and the other material is a combination of the first material and at lest one additive material which can alter a physical characteristic or property of the first material.

3. A method according to claim 2, wherein the additive material is a colorant.

4. A method according to claim 2, wherein the additive material is an ultra violet protective material.

5. A method according to claim 2, wherein the additive material is a reinforcing material.

6. A method according to claim 4, wherein the reinforcing material is glass powder or glass fibres.

7. A method according to claim 1, wherein the molten material is shaped by injecting it into a mold cavity, and the variation in composition is such that at least a portion of a surface layer of the molded article is of different physical characteristics or properties from the remainder of the article.

8. A method according to claim 7, wherein a blowing agent is delivered to the interior of the article in the mould after the formation of a surface layer free from the blowing agent.

9. A method according to claim 1, wherein the molten material is shaped by extruding it through a die, and the variation in composition of the material emerging from the screw feed means is such that the composition changes sequentially along the length of the extruded article.

10. A method according to claim 1, wherein the composition of the feed material is varied such that there is a progressive change in composition of the molded article between the or each said part of the article and the remainder of the article.

11. A method according to claim 1, wherein the screw feed means propels the molten plastics material to the shaping means by way of an injection piston and cylinder which accumulates the material fed from the screw feed means and then periodically propels the accumulated material to the shaping means.

12. In a method of molding plastics articles, each said article having at least one predetermined part of different composition from the remainder of the article, the method comprising passing a solid plastics feed material through a melting zone, propelling a quantity of the resultant molten material into a mold, allowing the plastics material to solidify, and removing the article from the mold, wherein the composition of the materials entering the mold is varied cyclically, the improvement comprising monitoring progress of materials through the melting zone and controlling the sequence of feeding of first and second feed materials in response thereto so as to provide in the feed material entering the melting zone, at a position remote from the mold, sequential layers of first and second materials, the size and spacing of the layers being chosen such that the first and second materials form predetermined parts of each molded article.

13. Apparatus for molding plastics articles, each said article having at least one predetermined part of different composition from the remainder of the article, the apparatus comprising an injection device including screw feed means for propelling a solid plastics material through a melting zone, and for propelling the resultant molten plastics material to shaping means for shaping the molten material, including control means for monitoring the positions of said screw feed means and for controlling the introduction of different feed materials into said screw feed means at a location remote from said shaping means according to the instantaneous monitored position of said screw feed means so as to cyclically vary the composition of the plastics material entering the shaping means, whereby the composition of the material entering the shaping means is controlled to form said at least one predetermined part of the molded article of different composition from the remainder of the article.

14. Apparatus according to claim 13, comprising hopper means for feeding sequential layers of materials of different composition into the screw feed means, and control means associated with the hopper means to control the size and spacing of the layers such that a predetermined part of each molded article is of a different composition from the remainder of the article.

15. Apparatus according to claim 13, comprising means for introducing at said position along the length of the screw additive material to produce sequential layers of more than two materials, the size and spacing of the layers being chosen such that the materials from predetermined different parts of each molded article.

16. Apparatus according to claim 13, comprising a die through which the molten material is extruded.

17. Apparatus according to claim 13, comprising a mold tool into which the molten material is propelled.

18. Apparatus for molding plastics articles, each said article having at least one predetermined part of different composition from the remainder of the article, the apparatus comprising an injection device for passing a solid plastics material through a melting zone, and for propelling a quantity of the resultant molten material into a mold, including, at a position remote from the mold, means for monitoring progress of materials through the melting zone and for controlling the sequence of feeding of first and second materials in response thereto so as to provide in the material entering the melting zone sequential layers of said first and second materials, the size and spacing of the layers being chosen such that said first and second materials form predetermined parts of each molded article.

* * * * *